2,848,433
Patented Aug. 19, 1958

2,848,433

COPOLYMERIZED AND CROSS-LINKED EPOXIDE RESINS

Frederick R. Eirich, Tuckahoe, N. Y., assignor to Aries Laboratories, Inc., New York, N. Y., a corporation of New York No Drawing. Application December 30, 1953
Serial No. 401,383

8 Claims. (Cl. 260—45.5)

This invention relates to novel copolymers of epoxy resins containing an ethylenic unsaturation. More particularly, it relates to copolymers of (1) epoxide containing resins cross-linked with polycarboxylic acids having an ethylenic unsaturation and (2) ethylenically unsaturated monomers. The components react to produce novel resins of improved chemical, mechanical, and thermal properties having particular utility in varnish, coating, casting, and molding compositions.

An object of this invention is the preparation of low temperature, fast curing resins.

Another object of this invention is the preparation of compositions which will react to form resins resistant to attack by most chemicals.

Another object of this invention is the preparation of potting compositions which will readily interact without shrinkage or the formation of by-products to form infusible, resistant resins.

Other objects will become apparent from the description of the invention which follows.

According to the present invention, a fusible intermediate polyepoxide resin is mixed with a polycarboxylic acid anhydride containing an ethylenic unsaturation and a monomeric ethylenically unsaturated compound. Upon heating, the various polyepoxide chains are cross-linked by the polycarboxylic acid anhydride and the ethylenic unsaturations copolymerize, resulting in the formation of a hard infusible resin having particularly desirable chemical and physical properties. Various pigments, fillers, additives, or accelerators may be added to the mixture prior to interaction without materially affecting the properties of the product.

The fusible intermediate polyepoxide resin used as starting material in the practice of this invention is structurally an epoxyhydroxy polyether and a polyhydric phenol. Suitable polyhydric phenols may be mononuclear compounds possessing two or more nuclear hydroxyl groups such as resorcinol, hydroquinone, catechol, and the like. Polynuclear phenols may similarly be employed and among these are the polyhydroxy derivatives of diphenyls, diphenyl methanes, naphthalenes, and polynaphthalenes, such as bis-(4-hydroxyphenyl)-methane, bis-(4-hydroxyphenyl)-dimethyl methane, 4,4'-dihydroxydiphenyl, 1,5-dihydroxy naphthalene, and the like.

The epoxy groups are introduced by reacting the polyhydric phenol with an epihalohydrin or a diepoxide. The preparation of these starting materials is known in the art and it is generally effected by contacting the reactants in the presence of an alkali such as sodium hydroxide at elevated temperature.

It is probable, however, that the chain growth does not proceed smoothly. Analytical data indicates that there is branching of the molecule and some repetition of epoxy units so that the product requires the presence of an excess of epichlorhydrin. At the terminal of each branch of the molecule, there will be an epoxy group so that each molecule will contain at least two such radicals, and possibly as many as four.

The chain growth can be continued to the point where the intermediate product to be used as starting material becomes a brittle, fusible solid. This occurs at a molecular weight of about 2000. The molecular weight may be varied, however, by regulating the proportions of the reagents. Large excesses of the epichlorhydrin tend to decrease the molecular weight and to increase the amount of branching. Molecular weights of about 1500 to 3000 are suitable while 2000 to 2800 represents a preferred range. Molar ratios of epichlorhydrin to dihydric phenol corresponding to these ranges are 2 to 4, and preferably about 3.

The following example is illustrative of the preparation of the polyepoxide intermediate:

Example 1

Fifty seven grams of bis-(4-hydroxyphenyl)-dimethyl methane are added to two hundred and fifty milliliters of a 10% alcoholic sodium hydroxide solution (30 grams of NaOH, 100 cc. of $C_2H_5OH$, and 1500 cc. of water), and the mixture is heated at 55–65° C. for one-half hour in order to form the sodium salt of the phenolic compound. Ninety three grams of epichlorhydrin are next added to the alcoholic solution over a one hour period, while the temperature is maintained between 75–90° C. A pale, taffy-like material begins to separate from the solution after addition of from 10 to 15 grams of the epichlorhydrin. After all the epichlorhydrin has been added, the taffy-like material is separated from the hot solution by decanting. This residue is washed three times with boiling water, and once with cold water whereupon a white solid precipitate forms. Dissolution in hot acetone leaves behind the remainder of the sodium chloride. Evaporation on the steam bath produces a clear amber solid melting from 85–90° C. The molecular weight as determined in boiling benzene ranges from 2000 to 2800.

The polycarboxylic acid anhydride containing an ethylenic unsaturation serves to cross-link the polyepoxide chains by esterification of the epoxy and hydroxy groups. Suitable for this cross-linking are the anhydrides of the following acids: maleic, fumaric, itaconic, aconitic, cyclohexene dicarboxylic, pentadiene adduct of maleic, linoleic acid adduct of maleic, allyl phthalic, allyl succinic, vinyl ether of hydroxy succinic, terpinolene succinic, diphenylbutene maleic, polyethylene succinic, 4-vinyl cyclohexenedicarboxylic, and the like.

Concurrently with the cross-linking through esterification, the polycarboxylic acid anhydride containing an ethylenic unsaturation undergoes a copolymerization with the ethylenically unsaturated monomer. As the copolymerizable material there may be employed such materials as vinyl chloride, vinyl acetate, vinyl isobutyl ether, styrene, vinyl naphthalene, vinyl benzoate, methyl acrylate, methyl methacrylate, methyl linoleate, diphenyl butene, acrylonitrile, and various allylic materials such as diallyl phthalate, diallyl allyloxy succinate, triallyl cyanurate, triallyl carballate, triallyl trimesate, and the like.

The copolymerization may be effected merely by heating or preferably polymerization catalysts may be added to accelerate the reaction. Suitable catalysts include benzoyl peroxide, lauroyl peroxide, ditertiary butyl peroxide, ditertiary butyl hydroperoxide, methyl ethyl ketone hydroperoxide, and the like. Insofar as the copolymerization is concerned, it is apparent that it is the reaction between two ethylenically unsaturated compounds and the catalysts and conditions generally found suitable for reactions of this type may be employed successfully. The properties of the final resin may be varied considerably by changing the sequence of the epoxide, anhydride, and ethylenic reaction, which can be achieved by the use of different peroxides and different temperature cycles.

Specifically, the epoxide intermediate resin, the polycarboxylic acid anhydride containing an ethylenic unsaturation, and the ethylenically unsaturated monomer are mixed thoroughly and the mass is heated to effect the reaction. To the reaction mass there may be added various other materials such as fillers, coloring agents, or catalysts, either to alter the properties of the end products or to decrease the cost of the final resin. The temperature and time of heating are interrelated, i. e., the higher the temperature, the shorter the time of heating. Generally temperatures in the neighborhood of 100° C. maintained for several hours have proven sufficient for complete reaction.

While the proportions of the reactants may be varied, particularly desirable properties accrue to those resins wherein the polycarboxylic acid anhydride has been used in such quantity that substantially all of the epoxy groups have undergone reaction. Since the epoxy groups are more reactive than the hydroxy groups the former will preferentially undergo reaction until exhausted. Since each epoxy group is the anhydride of two hydroxyl groups, and since each acid anhydride group represents two acid functions, the reactants are preferably employed in such quantities that there are approximately an equal number of epoxy and acid anhydride functions present. Each epoxy radical can combine with one molecule of hydrogen chloride and by determining the combining weight of the epoxy resin with hydrogen chloride, the quantity of epoxy groups and the approximate quantity of acid anhydride necessary for stoichiometric reaction can readily be computed.

These theoretical considerations merely give approximate proportions. In practice, the suitable proportions differ somewhat from those indicated due to considerations of steric hindrance, branching, and complex side reactions of an unknown nature. The molecular weights of the polycarboxylic acid anhydrides suitable for the reaction do not vary too widely. The anhydrides are generally employed in about 20 to 40 parts by weight for each 100 parts of intermediate resin. The higher values are preferably employed with the anhydrides of higher molecular weight.

Less than the preferred amount of acid anhydride will produce a resin having free epoxy groups, whereas excess anhydride will produce resins having unreacted anhydride functions. Accordingly, the finished resin will be capable of undergoing further reaction and change, making it less desirable for many commercial applications where it is necessary to use a product of fixed and relatively permanent characteristics.

The amount of ethylenically unsaturated monomer employed may be varied so that it is present in an amount ranging between 2 and 40 parts by weight for each 100 parts of intermediate resin. The preferred range includes 8 to 12 parts by weight. Based on the molar quantity of acid anhydride, the approximate preferred ratio is from ½ to 2 moles of monomer.

The lower value of about 2 parts by weight represents a threshold value below which the desirable properties of increased flexibility are not exhibited. Above that value the finished products exhibit increased flexibilities until at high values the resins are too soft for the indicated uses.

The several ingredients will react without the formation of by-products and with substantially no change in volume, rendering them particularly suitable for casting applications. In addition, no complex equipment is necessary to effect the reaction and only heating to moderate temperatures is required. The final products are characterized by their chemical inertness, their mechanical strength, and their superior electrical properties. Because of these properties they are especially useful in potting operations, i. e., that type of casting wherein electrical elements are embedded within the infusible resin. Such application demands a resin which, in addition to being a good electrical insulator, is resistant to moderate temperatures maintained over a protracted time interval. Since the embedded electrical elements themselves generate heat upon the passage of a current, the potting materials must be able to withstand this internal heat as well as externally applied heat of moderate temperatures.

The following examples are furnished by way of illustrating the practice of this invention, rather than by way of limitation:

*Example II*

3.3 pounds of intermediate epoxy resin produced as in Example I are melted and 1.0 pound of cyclohexene dicarboxylic acid anhydride and 0.3 pound of vinyl naphthalene are added with stirring. The temperature is brought to 115° C. and maintained for 6 hours. A hard infusible resin results which upon cooling proves to be tough and extremely resistant to chemical attack by solvents.

*Example III*

To 3.5 pounds of molten intermediate epoxy resin produced as in Example I there are added 1.5 pounds of 1,4-diphenyl butene-1, .7 pound of maleic acid anhydride, and 1 ounce of ditertiary butyl peroxide. The mixture is maintained at 130° C. for 8 hours. The resulting resin is extremely tough; it does not soften below 290° C. and even then retains its shape and strength for more than 200 hours.

*Example IV*

Three pounds (3.0) of the intermediate epoxy resin of Example 1 are melted and maintained at 110° C. To the melt there are added .8 pound of methyl linoleate, .6 pound of maleic acid anhydride, .3 pound of triallyl cyanurate, and 1 ounce of tertiary butyl peroxide. With stirring the temperature is brought up to 120° C. and the heating continued for 1 hour. Further heating for 8 hours at 125° C. results in an infusible and insoluble resin of a tensile strength in excess of 25,000 p. s. i. and a flexural strength in excess of 250,000 p. s. i.

*Example V*

3.5 pounds of intermediate epoxy resin produced in accordance with the procedure of Example I are melted and mixed with 1.2 pounds of aconitic acid anhydride, .5 pound of acrylonitrile, and 1 ounce of methyl ethyl ketone hydroperoxide. The materials are reacted as in Example III, resulting in the formation of a final resin of high stability.

In commerce, the ingredients may each be packaged and shipped separately, leaving the compounding to the consumer. In place thereof, the several ingredients may be separately packaged within a single container, each separate package containing the requisite amount of material for blending with the other packages. As an alternative, the intermediate epoxy resin which is generally a solid can be powdered and mixed with the ethylenically unsaturated monomer without fear of preliminary reaction.

Various changes and modifications may be made without departing from the spirit and scope of this invention, as hereinafter claimed.

I claim as my invention:

1. The resinous reaction product obtained by heating about 100 parts by weight of glycidol poly-ether of 4,4'-dihydroxydiphenyl dimethyl methane, having a molecular weight of about 2000 to about 2800, about 25 parts to about 30 parts of a polycarboxylic acid anhydride containing an ethylenic unsaturation, and about 8 to about 12 parts of an ethylenically unsaturated monomer which is inert with respect to said ether.

2. The resinous reaction product obtained by heating about 100 parts by weight of a glycidol poly-ether of 4,4'-dihydroxydiphenyl dimethyl methane having a molecular weight of about 2000 to about 2800, about 30 parts by weight of cyclohexene dicarboxylic acid anhydride, and about 9 parts by weight of vinyl naphthalene.

3. The resinous reaction product obtained by heating about 100 parts by weight of a glycidol poly-ether of 4,4'-dihydroxydiphenyl dimethyl methane having a molecular weight of about 200 to about 2800, about 20 parts by weight of maleic acid anhydride, and about 40 parts by weight of 1,4-diphenyl butene-1.

4. The resinous reaction product obtained by heating about 100 parts by weight of a glycidol poly-ether of 4,4'-dihydroxydiphenyl dimethyl methane having a molecular weight of about 2000 to about 2800, about 35 parts by weight of aconitic acid anhydride, and about 15 parts by weight of acrylonitrile.

5. The resinous reaction product obtained by heating about 100 parts by weight of a glycidol poly-ether of 4,4'-dihydroxydiphenyl dimethyl methane having a molecular weight of about 2000 to about 2800, about 20 parts by weight of maleic acid anhydride, about 25 parts by weight of methyl linoleate, and about 10 parts by weight of triallyl cyanurate.

6. The resinous reaction product obtained by heating about 100 parts by weight of a resinous polyepoxide produced by reacting a polyhydric phenol with an epihalohydrin, about 20 to 40 parts by weight of a polycarboxylic acid anhydride containing an ethylenic unsaturation, and an ethylenically unsaturated monomer copolymerizable with said anhydride, said monomer being present in about ½ to 2 times the molar amount of said anhydride.

7. The resinous reaction product obtained by heating about 100 parts by weight of an intermediate resin prepared from 4,4'-dihydroxydiphenyl dimethyl methane and about 2 to 4 times the molar amount of epichlorhydrin and having a molecular weight of about 1500 to about 3000, about 20 to 40 parts by weight of a polycarboxylic acid anhydride containing an ethylenic unsaturation, and an ethylenically unsaturated monomer copolymerizable with said anhydride and present in about ½ to 2 times the molar amount of said anhydride.

8. A composition of matter capable of setting to an infusible resin upon the application of heat comprising about 100 parts by weight of a resinous polyepoxide produced by reacting a polyhydric phenol with an epihalohydrin, said polyepoxide having a molecular weight from about 1500 to about 3000, about 20 to 40 parts by weight of a polycarboxylic acid anhydride containing an ethylenic unsaturation, and from 8 to 12 parts by weight of an ethylenically unsaturated monomer copolymerizable with said anhydride.

References Cited in the file of this patent

UNITED STATES PATENTS

| | | |
|---|---|---|
| 2,569,920 | Buck et al. | Oct. 2, 1951 |
| 2,604,464 | Segall et al. | July 22, 1952 |
| 2,637,716 | Ott | May 5, 1953 |
| 2,691,007 | Cass | Oct. 5, 1954 |
| 2,783,214 | Homan | Feb. 26, 1957 |